Feb. 27, 1968 P. BRÜNINGHAUS 3,370,706
VIBRATING SCREEN DRIVE
Original Filed Aug. 26, 1963 2 Sheets-Sheet 1

INVENTOR
Paul Brüninghaus

BY Spencer & Kaye
ATTORNEYS

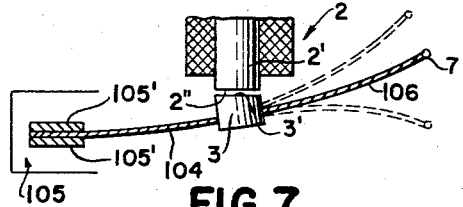
FIG.7.
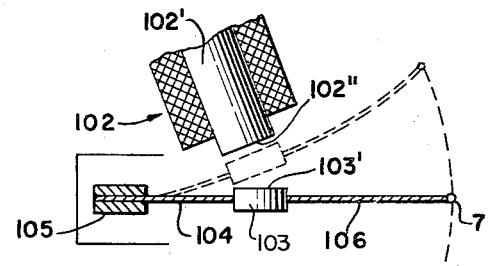
FIG.8.
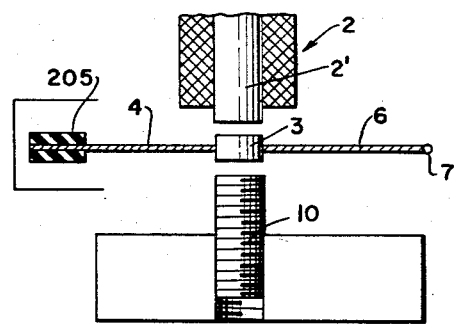
FIG.9.
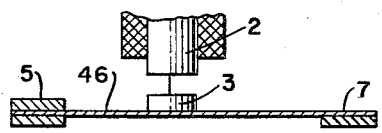
FIG.10.
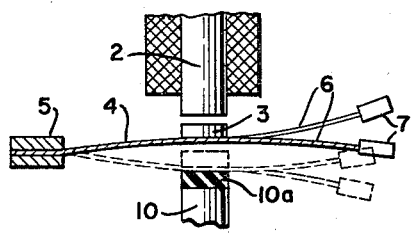
FIG.11.
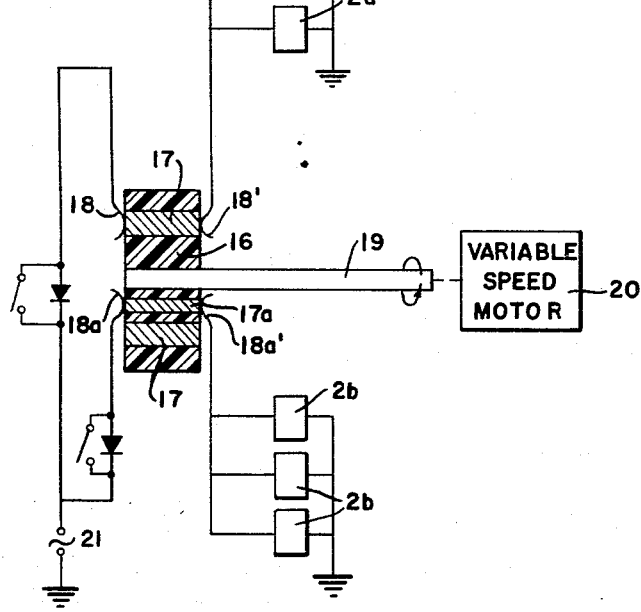
FIG.12.
FIG.13.
INVENTOR
Paul Brüninghaus

United States Patent Office 3,370,706
Patented Feb. 27, 1968

3,370,706
VIBRATING SCREEN DRIVE
Paul Bruninghaus, Remscheid, Luttringhausen, Germany, assignor to Rhewum Rheinische Werkzeug- und Maschinenfabrik G.m.b.H., Remscheid, Luttringhausen, Germany
Continuation of application Ser. No. 304,755, Aug. 26, 1963. This application Oct. 24, 1966, Ser. No. 589,132
Claims priority, application Germany, Sept. 5, 1962, R 33,444
16 Claims. (Cl. 209—368)

ABSTRACT OF THE DISCLOSURE

A device for efficiently electrically driving a flexible screen of the type used as an industrial sieve for imparting a vibrating motion to the same. The device consists of a number of semi-flexible arms, fixed at one end and attached at the other directly to the edge of the flexible screen. Each arm is provided with an alternating current electromagnet, the field of which is directed to an armature attached and located substantially midway between the two ends of the arm. The vibrating motion imparted to the arm by the alternating magnetic field is "amplified" through the inherent flexibility of the arm itself and transmitted to the arm-suspended screen.

This application is a continuation of application Ser. No. 304,755, filed Aug. 26, 1963, now abandoned.

The present invention relates to a drive for a machine of the type used for preparing materials, as for example, machines for dewatering, concentrating, screening, classifying, and so on, materials such as ore, coal, gravel, and the like. The drive according to the present invention incorporates means for producing pulses, e.g., an electromagnet energized by alternating current, a freely oscillating armature arranged in the magnetic field of the magnet, and a transmission device which is struck or moved by the armature and which acts on or is otherwise operatively associated with the machine.

In known drives of the above type, both sides of the armature are spring-mounted in the frame or housing of the pulse generator. If the drives incorporate electromagnets, they utilize the alternating frequency of the current mains from which the electromagnet is energized (generally 50 to 60 c.p.s.) and, in the case of a freely oscillatable armature, produce sinusoidal oscillations of, for example, 100 to 120 c.p.s. Other drives of this type are in the nature of motors incorporating an unbalance, i.e., an eccentric mass, and still other types of drives used for this purpose incorporate mechanically, hydraulically or pneumatically actuated hammer-like elements. In known electromagnetic drives of this type, in which the amplitude of the armature oscillations is limited, for example by means of abutments, the sinusoidal oscillations have high-frequency harmonics superimposed on them.

If a drive of the above type, incorporating an armature which is resiliently held on both sides, is used for driving the surface of a screening machine, the best that can generally be obtained are oscillations having an amplitude of about 1 mm. or smaller. This obviously limits the usefulness of the machine.

Heretofore, a substantial portion of the kinetic energy produced by the drive and acting on the armature, was lost in the spring mounting of the armature, so that only small amounts of energy were available to oscillate the armature.

It is, therefore, the primary object of the present invention to provide a drive which overcomes the above drawbacks, and, with this object in view, the present invention resides in a drive which incorporates an arm that is held at but one end, which arm carries an armature and is oscillatable, at its other end, in two degrees of freedom as will be explained more particularly below. More particularly, the invention resides in a drive which comprises support means, arm means having two opposite ends, an armature carried by the arm means intermediate the ends thereof, an electromagnet arranged on the support means to coact with the armature, and means for mounting but one of the ends of the arm means on the support means, thereby to leave the other end of the arm means free to move in two degrees of freedom, the first degree of freedom being the movability of the arm means before the armature strikes against the electromagnet while the second degree of freedom is the movability of the arm means after the armature abuts against the electromagnet. Means are further provided for connecting the other end of the arm means to a part of a machine which is to be moved or vibrated, in particular, to the naturally flexible edge of the webbing of a screening machine, the arrangement being such that the arm means, the armature, the connecting means and the mentioned part of the machine together form an oscillatable component.

Additional objects and advantages of the present invention will become apparent upon consideration of the following description when taken in conjunction with the accompanying drawings in which:

FIGURE 7 is a sectional view of another embodiment, showing the parts in another position.

FIGURE 8 is a sectional view of still another embodiment of the present invention.

FIGURE 9 is a sectional view of yet another embodiment of the present invention.

FIGURE 10 is a sectional view of a further embodiment of the instant invention.

FIGURE 11 is a sectional view showing the operation of a drive according to the present invention.

FIGURE 12 is a front view showing a disc constituting part of an electric control device intended for use with a machine according to the present invention.

FIGURE 13 is a sectional view taken on line 13—13 of FIGURE 12 and includes a circuit diagram showing the electrical connections of the electromagnets with the control device.

Figure 1:
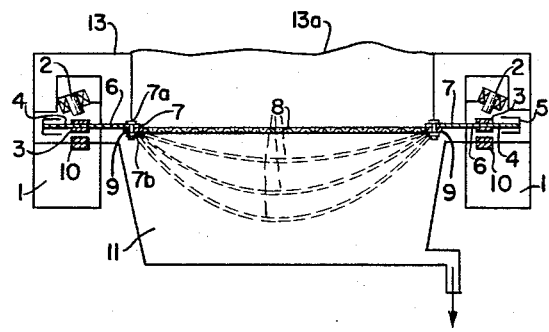
FIGURE 1 is a diagrammatic front elevational view of a screening machine according to the present invention.
Figure 2:
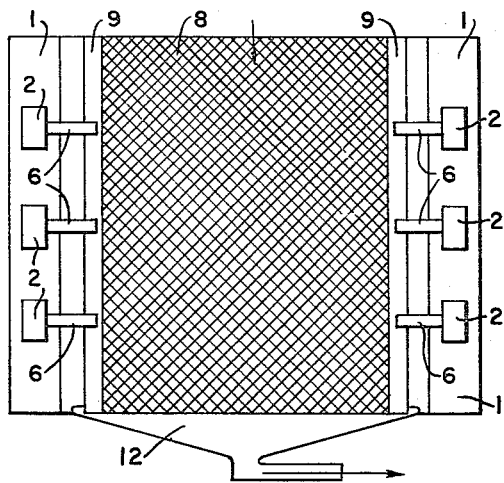
FIGURE 2 is a top view of the structure shown in FIGURE 1.
Figure 3:
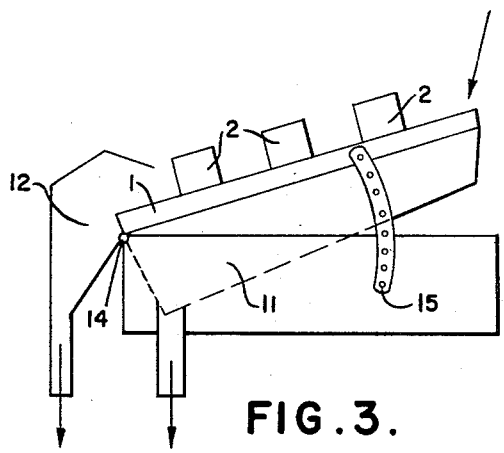
FIGURE 3 is a side view of the structure of FIGURES 1 and 2.

Referring now to the drawings and to FIGURES 1 to 3 thereof in particular, the same show a screening machine incorporating two longitudinal beams 1 which are themselves supported by a suitable frame (not shown in FIGURES 1 to 3), these beams constituting the sole support means for carrying the components of the machine insofar as they are related to the present invention. Each of the beams 1 carries three electromagnets 2 which are arranged so as to be inclined. Below each electromagnet 2 is a corresponding armature 3 connected to arms 4, one end of each of which arms is held by a mounting device 5 which mounts such arm on the beam 1. The other ends 7 of the arms 6 which project from the other side of each armature 3 carry the fabric or other webbing 8 constituting the screening surface and located between the beams 1. The webbing proper is bound at its edges by flexible stripping 9 which, as shown in the drawings, is actually held by the other ends 7, this stripping thus serving as a movable mounting for the other ends 7. The ends 7 are suitably connected to the stripping 9, as, for example, by connecting means such as a bolt 7a and nut 7b. The transverse ends of the webbing are free, so that the webbing as a whole is freely movable in a direction transverse to its length.

The beams 1 are displaceable with respect to each other, so that the hang of the webbing 8 can be adjusted as desired, this being shown by the dashed lines.

Furthermore, the arrangement is such that both beams 1 together can be inclined at different angles, so that the webbing 8 can be given any desired angle of inclination. The beams can also be made mutually displaceable relative to each other in horizontal as well as vertical direction.

In order to prevent the armature 3 from moving too far away from the respective electromagnets 2, the arrangement is provided with abutments 10 which can also serve to support the armatures 3 in their rest positions, as well as to superimpose high frequency harmonics on the armature oscillations.

The beams 1 also carry a receiving trough 11 into which falls the material which can pass through the webbing 8, as well as a receptacle 12 which is arranged at the delivery end of the webbing (the left hand end, as viewed in FIGURE 3) which is opposite to the receiving end (the right hand end, as viewed in FIGURE 3) at which the material to be screened is applied onto the webbing, the receptacle 12 being at such a height as to receive the material which does not pass through the webbing 8. Also shown is an upper cover 13 which is likewise carried by the beams 1, the center piece 13a of the cover being elastically expansible so as to permit the distance between the beams to be varied.

One end of the above-described structure, preferably the delivery end, is pivotally mounted as shown at 14, there being suitable locking means 15 for holding the structure in any desired angular position.

Figure 4:
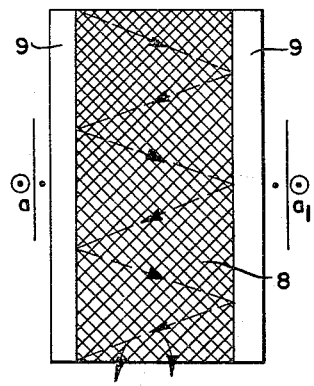
FIGURE 4 shows the path which will be followed by the material being screened if the electromagnets on the sides of the webbing are energized in a given manner.

FIGURE 4 shows the path followed by the material being screened if an exciting frequency $a$ and $a_1$ of 100 c.p.s. is applied alternately on opposite sides, the rest interval being ½ second. As shown in FIGURE 4, the path followed is a generally zigzag path.

Figure 5:
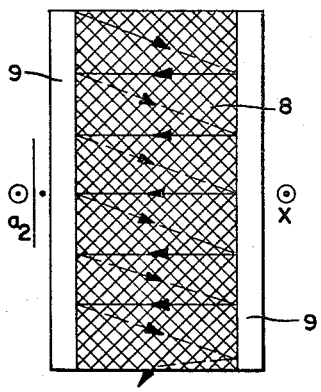
FIGURE 5 shows the path which will be followed by the material being screened if the electromagnets on the sides of the webbing are energized in a different manner.

FIGURE 5 shows the path followed if the left side is energized with a frequency $a_2$ of 50 c.p.s. and the right side from 2 to 10 c.p.s as a stroke or impact $x$, with a time interval of 80 to 20.

It will be appreciated that, by varying the frequencies and time intervals, various other paths can be obtained.

Figure 6:
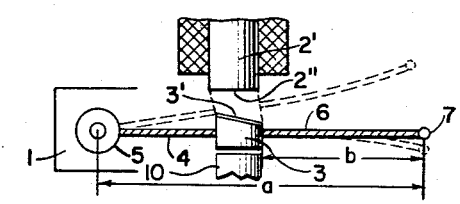
FIGURE 6 is a sectional view, on an enlarged scale, of one embodiment of a drive according to the present invention.

FIGURE 6 shows one embodiment of the drive per se in detail, the arms 4 and 6 being rigid and connected to opposite sides of the armature 3. The end 7 of the arm 6 which is not secured to the beam serves as the actual pulse generator. The armature 3 has an upper surface 3', which, when the component incorporating the parts 4, 3, 6, is in the rest position illustrated in FIGURE 6, is inclined with respect to the lower surface 2" of the core 2' of the electromagnet 2, so that, upon maximum attraction, the armature surface 3' will be substantially parallel to the core surface 2". The mounting device 5 can be constituted by a bearing which allows pivotal movement of the arm 4. As shown in FIGURE 6, the end of the arm means which is not secured to the beam and which constitutes the oscillatable component is free to move in two degrees of freedom $a$ and $b$, i.e., the free arm means will have a first degree of freedom while the entire arm means, extending over length $a$, moves, and its second degree of freedom after the armature 3 strikes the electromagnet 2 and only so much of the arm as extends over the length $b$ can move.

FIGURE 7 shows the oscillatable component in its maximum attracted position in which the upper surface 3' of the armature 3 is parallel to the lower surface 2" of the core 2' of the electromagnet 2. In FIGURE 7, the arms 104 and 106, instead of being substantially rigid, are constituted by leaf springs of suitable strength, in which case the inherent elasticity of the arm 106 will, upon oscillation of the component 104, 3, 106, swing between the extreme positions represented by dashed lines. The mounting device 105 used in this embodiment is constituted by two plates 105' which clamp the left end of the spring arm 104.

The embodiment of FIGURE 8 differs from those which are described above in that the armature 103 has an upper surface 103' parallel with the arms 104 and 106, while the electromagnet 102 is so inclined (cf. FIGURE 1) that the lower surface 102" of the core 102' will, upon maximum attraction of the armature 103, be parallel with the upper surface 103' thereof.

FIGURE 9 shows an embodiment which is provided with an adjustable abutment 10, the same being threadedly mounted so that the distance between the upper end of the abutment 10 and the armature 3, while the latter is in rest position, can be varied by turning the abutment 10. The purpose of the abutment is to prevent the armature from moving beyond the magnetic field produced by the electromagnet, as well as to superimpose harmonics on the oscillation of the component 4, 3, 6. The abutment may also serve to support the armature 3 in its rest position. FIGURE 9 also shows the mounting device 205 as being constituted by a rubber joint which clamps the left hand end of the arm 4 to allow the oscillatable component to move out of its rest position.

The embodiment of FIGURE 10 differs from the previously described ones in that the two arms are constituted by a single continuous element such as a rod 46 which carries the armature 3. The mass at the free end 7 represents the weight of the webbing 8 supported by the oscillatable component 46, 3.

FIGURE 11 shows the operation of the device. The mass at the free end 7 will lag with respect to the armature, so that the oscillations at the free end 7 can be said to be phase-shifted with respect to the oscillations of the armature 3. FIGURE 11 also shows the abutment 10 as being equipped with a resilient tip 10a.

FIGURES 12 and 13 shows a control device for use with the variable drive according to the present invention. The same includes a shaft 19 carrying a disc 16 made of insulating material and driven by a variable speed motor 20. The disc 16 carries concentrically arranged bridging contacts 17 and 17a which, depending on the desired rate of pulse generation, are, in circumferential direction, linear or substantially point-shaped, thereby to produce either prolonged or very short instants of energization as will be described. The contacts 17 are arranged about one circuit on the disc 16 while the contacts 17a are arranged about another circuit of different (here smaller) diameter. Coacting with the disc 16 are two sets of brushes 18, 18', and 18a, 18a', the first set being arranged so as to be bridged by the contacts 17 and the second set being arranged so as to be bridged by the contacts 17a. The contacts 18 and 18a are connected to one terminal of a suitable source 21 of electric power whose other terminal is grounded. The brush 18' is connected to one terminal of each of a plurality of electromagnets 2a, the other terminals of each of which is grounded, while the brush 18a' is connected to one terminal of each of a plurality of electromagnets 2b, the other terminal of each of which is likewise grounded. The electromagnets 2a represent the electromagnets 2 on one side of the webbing 8 while the electromagnets 2b represent those on the other side of the webbing. It will be appreciated that each electromagnet 2a will be energized throughout time intervals whose occurrence and duration is determined by the position and circumferential length of the contacts 17, while each electromagnet 2b will be energized throughout time intervals whose occurrence and duration is determined by the position and circumferential length of the contacts 17a. In the illustrated embodiment, each electromagnet 2a will, during one revolution of the disc 16, be energized three times, while each electromagnet 2b will be energized twice, the instant and duration of energization being, as stated above, dependent on the position and circumferential length of the various contacts 17, 17a. A circumferentially very short, or substantially point-shaped, contact will produce a single stroke It will be seen from the above that the energization of each set of electromagnets can readily be preselected by providing a disc on which the contacts 17, 17a, are appropriately configured. If desired, it is also possible to provide either or both of the contact rings along which the contacts 17, 17a, are arranged with two or more sets of brushes. If, for example, an additional set of brushes 18, 18', were provided and connected in parallel with the set 18, 18', already shown, the electromagnets 2a would, during each revolution of the disc 16, receive 2×3=6 intervals of energization.

The following are further numerical examples of how the two rows of drives may be actuated:

*Example 1*

One row of drives is energized at a frequency of 100 c.p.s., and the other at a frequency of 50 c.p.s., the circuit diagram of FIGURE 13 then being modified so that each set of electromagnets is energized with a voltage of different frequency.

*Example 2*

The two rows of drives are energized alternately, as follows:

One row of drives is energized at a frequency of 100 c.p.s. for a time interval of 4/8 second, while the other row of drives is energized at a frequency of 50 c.p.s. for a time interval of 2/8 second.

*Example 3*

The two rows of drives are energized as follows:
During a given time interval, one row of drives is energized at 50 c.p.s. for 2×2/8 second, while the other row of drives is energized at 50 c.p.s. for 4×1/10 second.

*Example 4*

One of the two rows of drives is energized at 50 c.p.s., while the other row of drives is energized to produce a series of single strokes (cf. FIGURE 5).

It will be seen, then, that the material to be screened can be made to follow a given path, depending on the energization of the two rows of drives. If a long, zigzag screening path is desired, the series of strokes of Example 4 will be used, because this will send the material from one side of the screen to the other.

The drive means according to the present invention, in which one of the ends of the arm means forming part of the oscillatable component is free to move in two directions, produces oscillations whose amplitude is substantially greater than those produced by comparable prior art drives. In particular, it has been found that whereas with prior art drives in which the ends of the arm means are not free to move in two directions, the amplitude of oscillation is about 1 mm., the freedom of movement as taught by the present invention allows amplitudes of 2 mm. or higher to be reached. Consequently, the efficiency of the machine is substantially increased.

Another feature of the present invention is that the weight of the machine part connected to the end 7 acts as a return force which acts against the magnetic field produced by the electromagnets. This allows the armature to oscillate in synchronism with the frequency applied to the electromagnet, so that, as stated above, the arm means, the armature, the connecting means and the mentioned machine part together form an oscillatable component. This feature also contributes to the fact that greater oscillation amplitudes can be obtained.

In practice, the electromagnets can be energized with alternating current via stepping transformers or half-wave rectifiers, or via a program control device which allows any one of a plurality of programs to be used.

According to another feature of the present invention, the drives, instead of being arranged in lines at opposite sides of a webbing, are arranged next to each other along a closed curve, e.g., a circle about a webbing or other part of a machine which is to be vibrated.

According to another feature, the plurality of drives which are connected to the webbing or other machine part are subdivided into two or more groups (e.g., one group being constituted by the drives 2a and the other by the drives 2b, as shown in FIGURE 13) which are energized in accordance with preselected programs which are correlated to each other, with respect to frequency, intensity, and duration of intervals, to produce a desired screening effect. In certain cases, the "group" of drives may include but one drive. In any event, the energization of the various drives may be so timed as to cause the part to be vibrated to undergo the desired movement.

It will be understood that the above description of the present invention is susceptible to various modifications, changes, and adaptations, and the same are intended to be comprehended within the meaning and range of equivalents of the appended claims.

What is claimed is:
1. A screening machine comprising, in combination:
 (1) flexible webbing having two opposite lateral flexible edges;
 (2) a plurality of drives for shaking said webbing each one of said drives including
   (a) support means;
   (b) arm means having two opposite ends;
   (c) an armature carried by said arm means intermediate said ends thereof;
   (d) an electromagnet arranged on said support means to coact with said armature;
   (e) means for mounting but one of said ends of said arm means on said support means, thereby to leave the other end of said arm means free to move in two degrees of freedom; and
   (f) means connecting said other end of said arm means to one of said flexible edges of said webbing;
   (g) said arm means, said armature, said connecting means and said webbing forming an oscillatable component;
 (3) some ones of said plurality of drives arranged along one of said lateral edges of said webbing, the respective connecting means of said drives connecting said one edge to the respective arms means; and
 (4) the remaining ones of said plurality of drives arranged along the other of said lateral edges of said webbing, the respective connecting means of said drives connecting said other edge to the respective arm means.

2. A screening machine as defined in claim 1, further comprising an abutment arranged opposite said electromagnet and positioned to be engaged either by said arm means or said armature.

3. A screening machine as defined in claim 1 wherein said arm means are substantially rigid, and wherein said mounting means are a means for movably mounting said one end of said arm means.

4. A screening machine as defined in claim 3 wherein said mounting means comprises a pivot joint.

5. A screening machine as defined in claim 3 wherein said mounting means comprise resilient holding means which hold said one end of said arm means.

6. A screening machine as defined in claim 1 wherein said arm means include leaf spring means extending at least between said armature and said one end of said arm means and wherein said mounting means fixedly hold said one end of said arm means.

7. A screening machine as defined in claim 1 wherein said arm means include leaf spring means extending at least between said armature and said other end of said arm means.

8. A screening machine as defined in claim 1 wherein said arm means include two parts, one extending between said armature and said one end of said arm means and the other extending between said armature and said other end of said arm means.

9. A screening machine as defined in claim 1 wherein said arm means are constituted by a single element extending from said one end of said arm means to said other end thereof.

10. A screening machine as defined in claim 1 wherein said electromagnet includes a core having a surface and said armature has a surface directed toward said core, said surfaces being so oriented with respect to each other that, upon maximum attraction of said armature by said electromagnet, said surfaces are substantially parallel with each other.

11. A screening machine as defined in claim 1 wherein the support means of all of the drives along said one side of said webbing is constituted by a beam common to all such drives and the support means of all of the drives along said other side of said webbing is constituted by another beam common to all such last-mentioned drives.

12. A screening machine as defined in claim 11 wherein said beams are adjustable with respect to each other to permit variation of the width and hang of said webbing.

13. A screening machine as defined in claim 11 wherein said beams are mounted on a frame to permit adjustment of the inclination of the beams.

14. A screening machine as defined in claim 1, further comprising means for energizing given groups of electromagnets in accordance with predetermined programs, respectively.

15. A screening machine as defined in claim 1, further comprising means for energizing the electromagnets of the plurality of drives arranged along said one side in accordance with a preselected program, and means for energizing the electromagnets of the plurality of drives arranged along said other side in accordance with another preselected program, said programs being correlated to each other, with respect to frequency, intensity, and duration of intervals, to produce a desired screening effect.

16. A screening machine as defined in claim 15 wherein said energizing means comprise a rotatory disc, contact means arranged about at least one circle on said disc which is concentric with the axis of said disc for establishing an electrical connection which energizes said electromagnets, and a variable speed motor for driving said disc at a desired rotational speed.

References Cited

UNITED STATES PATENTS

| 862,856 | 8/1907 | Tygard | 259—72 X |
| 1,179,428 | 4/1916 | Hayes | 209—368 X |
| 2,300,605 | 11/1942 | Wilcox | 209—368 X |
| 2,333,338 | 11/1943 | Rapp | 209—368 X |

FOREIGN PATENTS

| 459,697 | 9/1913 | France. |
| 663,217 | 3/1929 | France. |

HARRY B. THORNTON, *Primary Examiner.*

R. HALPER, *Assistant Examiner.*